(12) United States Patent
Sundqvist

(10) Patent No.: US 9,008,939 B2
(45) Date of Patent: Apr. 14, 2015

(54) VEHICLE CONTROL SYSTEM AND METHOD USING CONTROL ALLOCATION AND PHASE COMPENSATION

(75) Inventor: Bengt-Göran Sundqvist, Linköping (SE)

(73) Assignee: SAAB AB, Linköping (SE)

( * ) Notice: Subject to any disclaimer, the term of this patent is extended or adjusted under 35 U.S.C. 154(b) by 1701 days.

(21) Appl. No.: 12/068,843

(22) Filed: Feb. 12, 2008

(65) Prior Publication Data

US 2008/0215191 A1    Sep. 4, 2008

(30) Foreign Application Priority Data

Feb. 12, 2007  (EP) ..................................... 07102162

(51) Int. Cl.
*G06F 17/00* (2006.01)
*G05D 1/00* (2006.01)
(Continued)

(52) U.S. Cl.
CPC ............ *G05B 13/021* (2013.01); *G05B 13/024* (2013.01); *G05B 13/02* (2013.01); *G05B 13/041* (2013.01); *B60K 31/00* (2013.01)

(58) Field of Classification Search
CPC .... G05B 13/02; G05B 13/021; G05B 13/024; G05B 13/041; B60K 31/00
USPC ......... 701/1, 3, 4, 7, 8, 36, 42, 60, 61, 93, 99; 340/438, 439; 180/170
See application file for complete search history.

(56) References Cited

U.S. PATENT DOCUMENTS 4,744,511 A * 5/1988 Kakehi et al. .................. 236/13
5,515,828 A * 5/1996 Cook et al. .................... 123/436
(Continued)

FOREIGN PATENT DOCUMENTS

| WO | WO-99/09461 A1 | 2/1999 |
| WO | WO-01/82007 A2 | 11/2001 |

OTHER PUBLICATIONS

Ola Härkegård et al.; Resolving actuator redundancy-optimal control vs. control allocation; Automatica 41 (2005) pp. 137-144.
(Continued)

*Primary Examiner* — Jack W Keith
*Assistant Examiner* — Chuong P Nguyen
(74) *Attorney, Agent, or Firm* — Venable LLP; Eric J. Franklin

(57) ABSTRACT

A vehicle control system and method combining control allocation and phase compensation for forming a phase compensated actuator command signal based on a control demand signal. A feedback unit includes a matrix multiplication unit for forming an estimated behavior signal, from a control efficiency matrix and the actuator command signal. The estimated behavior signal is fed to a second summation unit for forming a difference signal. The difference signal is processed by a filter unit for forming a feedback signal which is connected to a first summation unit for forming a modified control demand signal, such that the modified control demand signal is adjusted to always represent a control demand realizable by the vehicle. The modified control demand signal is further connected to the second summation unit and to a control allocator which output is then connected to the matrix multiplier to form a feedback loop.

11 Claims, 5 Drawing Sheets

(51) Int. Cl.
  *G05B 13/02* (2006.01)
  *G05B 13/04* (2006.01)
  *B60K 31/00* (2006.01)

(56) References Cited

U.S. PATENT DOCUMENTS

| | | | |
|---|---|---|---|
| 5,528,119 | A | 6/1996 | Rundqwist et al. |
| 6,259,223 | B1* | 7/2001 | Buck ............................. 318/610 |
| 6,591,169 | B2* | 7/2003 | Jones et al. ........................ 701/4 |
| 7,567,862 | B2* | 7/2009 | Pelton et al. .................... 701/33 |
| 8,082,047 | B1* | 12/2011 | Sharma ........................... 700/54 |
| 2004/0088059 | A1* | 5/2004 | Johnson et al. ................. 700/28 |
| 2005/0242532 | A1* | 11/2005 | Deo et al. ....................... 280/5.5 |
| 2006/0027710 | A1* | 2/2006 | Lavretsky et al. ............ 244/195 |
| 2006/0212140 | A1* | 9/2006 | Brackney ........................ 700/29 |
| 2009/0048748 | A1* | 2/2009 | Zhao et al. ..................... 701/59 |
| 2009/0143871 | A1* | 6/2009 | Gao et al. ....................... 700/29 |
| 2010/0318336 | A1* | 12/2010 | Falangas .......................... 703/8 |

OTHER PUBLICATIONS

Ola Härkegård; Backstepping and Control Allocation with Applications to Flight Control; 2003; pp. 105-186.
European Search Refport—Jun. 26, 2007.

* cited by examiner

VEHICLE CONTROL SYSTEM AND METHOD USING CONTROL ALLOCATION AND PHASE COMPENSATION

CROSS-REFERENCE TO RELATED APPLICATIONS

This application claims priority to European patent application 07102162.0 filed 12 Feb. 2007.

TECHNICAL FIELD

The present invention relates to the field of vehicle control. In particular it relates to methods and apparatus for improving performance and stability in a control system where the time derivative of an output from a subsystem is limited, resulting in that an input cannot be fulfilled. More particularly it relates to such methods and apparatus for improving control systems provided with some kind of control allocation.

BACKGROUND

In control theory and praxis, a control system of a vehicle can be viewed upon as a system performing two subsequent separate steps;

a first step comprising calculating a control demand based on operator commands and feedback signals and taking into consideration requirements on stability and performance; and a second step comprising calculating and distributing actuator signals to the available actuators, based on the control demand, such that said control demand will be realised. A more detailed explanation can be found in e.g., Härkegård, O; Backstepping and Control Allocation with Applications to Flight Control. Linköping University 2003. pp 105-107.

FIG. 1 shows a block diagram illustrating signal pathways in a prior art flight control system design based on such a division into two separate steps. When developing a such control system process feedback couplings may be constructed using any suitable design method such as e.g. PID (Proportional-Integrating-Derivating Control), linear quadratic minimization (LQ), exact linearization (NDI), adaptive methods etc.). The problem of distribution does not have to be considered, when designing software/hardware realising such a first step.

The design of software/hardware realising the second step can then be performed without having to consider the actual control laws used. In the second step, the distribution of the control demand is performed by distributing to the available actuators control signals that, when having had their effect on said available actuators, fulfils said control demand on the vehicle. This can be achieved by a variety of available methods. Either a fixed (non varying) function, in the linear case a matrix, can be used. In this case the distribution will not be able to adapt to varying effectiveness of the different actuators throughout the envelop of the controlled system. Methods are also available which adapt to the effectiveness of the actuators (control surfaces in aircraft case) and also redistributes the required control if any of the actuators should fail or reach its limitation in position or velocity. These methods usually optimize the actuator performance using the given effectiveness of each actuator, under the given constraints, using some norm (2norm, 1norm or infinity norm).

Further in the system of FIG. 1, a control allocation unit 115 takes said control demand and allocates and distributes actuator signal to available actuators of a vehicle 120. During this allocation and distribution, the control allocation unit 115 considers each actuator's ability to create a certain type of control effect, and modifies the distribution accordingly.

Such an allocation and distribution makes it possible to handle, independent of system total performance, varying actuator performance, e.g. rudder efficiency, but also actuator position and speed limitations, and also faults in actuators. Such faults may include loss, i.e., control surface moves freely, and locking i.e., control surface gets stuck in an arbitrary position.

Methods for control allocation and distribution of a control demand, are disclosed in e.g doctoral dissertation "Backstepping and Control Allocation with Applications to Flight Control" pages 105 to 186 by Ola Härkegård, mentioned above.

Prior art control allocation systems have a tendency to build up an undesired phase loss, when said control allocation systems together with available actuators no longer are able to fulfil current control demand. Non-considered phase loss in a regulatory system is highly undesired. With an operator in the control loop, the operator may experience a feeling of being disconnected from the system. Using aircraft design vocabulary this is called "Pilot In the Loop Oscillations" and they are feared by both pilots and designers.

WO 99/09461 to Buck discloses a method and an apparatus for phase compensation in a vehicle control system. The document describes how a single control surface actuation rate limiter is combined with phase advancing technology to handle phase loss during actuation rate limiting. However, this solution takes care of one actuator at a time. Thus, there is a need for a method and an apparatus for performing phase compensation in a system with multiple actuators, where control requirements can be redistributed within a group of actuators.

U.S. Pat. No. 5,528,119 to Rundqwist et al, discloses a method and a device for executing phase compensation in a motor-driven vehicle without control allocation.

SUMMARY OF THE INVENTION

With reference to FIG. 2, the present invention in its most general form relates to a control system for receiving k input signals, which may be represented by an input vector u, and for providing m output signals, which may be represented by an output vector x. The system provides the m output signals based on k modified input signals u', related to said k input signals, the m output signals being suitable for feeding m actuators. The control system is further provided with means for computing said m output signals such that when said m output signals are effected by said m actuators, the actuators give rise to changes in vehicle attitude status, said status will comply with a control demand expressed e.g., as a demanded attitude status described by the k input signals when this is within the performance limits of the actuators, and to comply with them to a lesser extent, keeping the vehicle controllable, when the k input signals describe a demanded attitude status outside the performance limits of the actuators.

Means are also provided for forming an estimated motion behaviour y', e.g., an estimated attitude state that comprises k estimated attitude signals. Means are also provided for forming k error signals $e_1 \ldots e_k$, represented by error vector $\epsilon$, as the difference between k modified input signals u' and said k estimated motion behavior signals $y'_1 \ldots Y'_k$. Means are also provided for amplifying and phase compensating said k error signals e forming k modified error signals $d_1 \ldots d_k$, represented by modified error vector d ($\delta$). Means are further provided for feeding back said modified error signals $d_1 \ldots d_k$ by forming the difference u' between the k input signals $u_1 \ldots u_k$ and said modified error signals $d_1 \ldots d_k$.

The estimated motion behavior y' calculated from actuator commands x, may not be the same as the one demanded by input signals u. The time derivative of $x_1$ to $x_m$ limited in these cases. It is however an advantage that a limited time derivative of x not necessarily means that the estimated motion behavior y' differs from the control demand vector u, i.e., the desired motion behavior, since the dimension of x often is greater than the dimension of u, i.e., m is greater than k.

Thus, according to a first aspect of the invention a vehicle control system for a vehicle is provided where said system comprises a control allocator for allocating a received control demand by providing actuator control signals derived from said control demand to a plurality of actuators, said system also comprising feedback means comprising a behaviour estimation unit for forming and for feeding back via a feedback loop a feedback signal representative of a difference between a desired vehicle behaviour represented by a control demand signal vector and an estimated vehicle behaviour that would result from applying said actuator signals at current travel conditions, the feedback signal being arranged to modify said control demand signal vector forming a modified control demand signal vector u' such that the modified control demand signal vector u', in the case the control demand signal vector u represents a control demand greater than performance limits of the vehicle under current conditions, will come to represent a control demand within said performance limits when the feedback signal takes effect.

The system is provided with an input for receiving the control demand signal vector u and an output for outputting the actuator control signals, and where the feedback loop for calculating and feeding back the feedback signal representative of a difference between the control demand signal vector and an estimated vehicle behaviour also comprises a transfer function means comprising asymptotically stable filters.

The vehicle control system may further comprise a control efficiency unit keeping and updating information regarding the efficiency of the actuators of the vehicle, and where behaviour estimation unit uses information from said control efficiency unit to calculate the estimated vehicle behaviour.

According to another aspect the control allocator is devised to form an actuator command signal vector, and the feedback means comprises a matrix multiplication unit for forming an estimated behaviour signal vector, the output of said matrix multiplication unit is connected to an input of a first summation unit for forming a motion difference signal vector, an output of said summation unit being connected to an amplification unit, an output from the amplification unit is connected to an input of a filter unit for forming a phase altered motion difference signal vector, an output of said filter unit is connected to an input of a second summation unit for forming a modified control demand signal vector as a difference between a control demand signal vector and said phase altered motion difference signal vector, the output of said second summation unit being connected to the input of the first summation unit and to an input of the control allocator.

According to yet a further aspect, the vehicle control system comprises a control efficiency matrix unit and a matrix multiplication unit that uses a control efficiency matrix of the control efficiency matrix unit to form an estimated behaviour signal vector by matrix multiplication of the actuator command signal vector and the control efficiency matrix.

The vehicle control system where control allocation may be performed by a control allocation method selected from a group of control allocation methods consisting of optimization based control allocation method, direct control allocation method and daisy chain control allocation method.

According to a further aspect, a vehicle control system is provided where said the unit comprises a number of asymptotically stable low pass filters for filtering each component of an input signal vector to the filter unit.

The vehicle control system where the filter unit comprises a number of first order low pass filters for filtering each component of an input signal vector to the filter unit.

According to another aspect the invention provides a method for controlling a vehicle having a plurality of actuators to influence its travel, the method comprising the following steps:

obtaining a control demand representative of a desired vehicle behaviour;

allocating actuators, i.e., distributing actuator commands based on said control demand by means of a control allocation method;

forming an estimated vehicle behaviour based on actuator commands;

forming a behaviour difference between the control demand and the estimated vehicle behaviour;

filtering the behaviour difference forming a filtered behaviour difference;

feeding back the filtered behaviour difference to modify the control demand forming a modified control demand;

using the modified control demand as a basis for allocating actuators;

The method of above where the step of forming an estimated vehicle behaviour based on actuator commands involves use of information from a control efficiency unit keeping and updating information regarding the efficiency of the actuators of the vehicle under current travel conditions.

The steps of the method may be detailed as follows:

obtaining a control demand signal vector;

obtaining a phase altered motion difference signal vector;

forming a modified demand signal vector by subtracting the phase altered motion difference signal vector from the control demand signal vector;

obtaining a control efficiency matrix;

forming an actuator command signal vector by performing control allocation based on the modified demand signal vector and on the control efficiency matrix;

controlling the vehicle by feeding the actuators with the actuator command signal vector;

forming an estimated behaviour signal vector by matrix multiplying the actuator command signal vector with the control efficiency matrix;

forming a motion difference signal vector by subtracting the modified control demand signal vector from the estimated behaviour signal vector;

forming the phase altered motion difference signal vector by amplifying and filtering the motion difference signal vector;

feeding back the phase altered motion difference signal vector.

The control allocation of the method may be performed by a control allocation method selected from a group of control allocation methods consisting of optimization based control allocation method, direct control allocation method and daisy chain control allocation method.

BRIEF DESCRIPTION OF THE DRAWINGS

These and other features, aspects and advantages of the present invention will become better understood with reference to the following description, appended claims, and accompanying drawings where

DETAILED DESCRIPTION OF PREFERRED EMBODIMENTS

Figure 1:
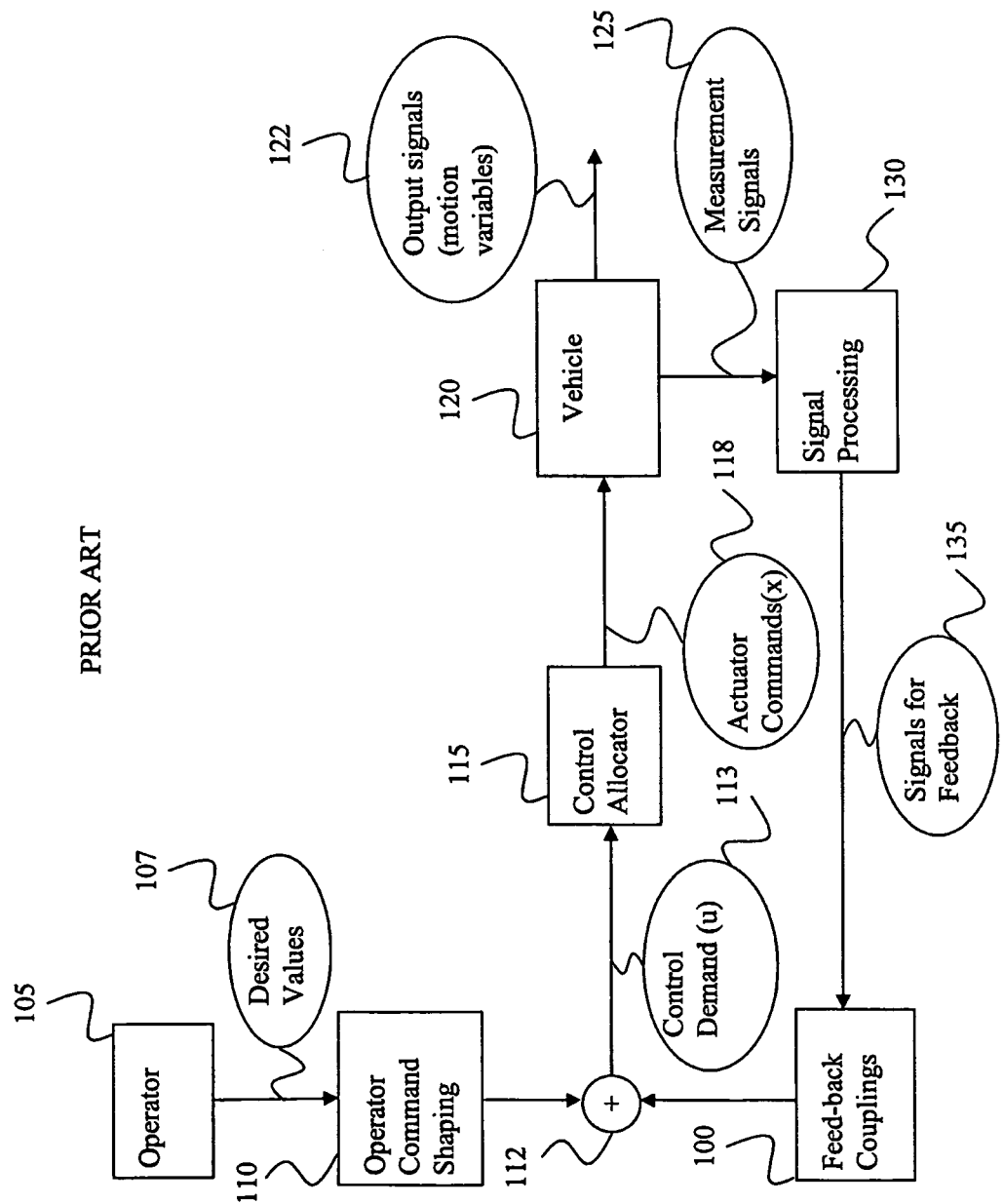
FIG. 1 is a block diagram showing a structure of a flight control system.

FIG. 1 shows a block diagram, demonstrating signal flow within a vehicle control allocation control system according to known technology. An operator, e.g., a pilot 105 or a travel control unit of an autonomous vehicle communicates desired values of vehicle state or waypoints or reference values in speed, altitude and course to the vehicle control system by some means e.g. by control stick movements, pedal movements or by conveying suitable signals, as in the case with an autonomous vehicle. The travel control system comprises an Operator Command Shaping Unit 110 that receives said desired values and filters them.

The filtered desired values are subsequently fed to a summation unit 112—In the summation unit 112 feedback signals and the filtered desired values are added together forming a sum. The sum may e.g. represent ordered angular accelerations of vehicle attitude angles. A control allocator 115 translates the ordered angular accelerations of vehicle attitude angles into actuator control signals for control surfaces of the vehicle 120. The inner detailed working of a control allocator is not the subject of the present invention and will not be described here. The reader is referred to the art literature. Subsequently, the vehicle 120 alters its attitude angles due to the position and change of position of said control surfaces. Attitude angles, and/or attitude angle velocities, and/or attitude angle accelerations are measured and fed as measurement signals 125 to a signal processing unit 130, which unit 130 feeds feedback signals 135 to a feedback couplings unit 100, which in turn delivers appropriate values for adding to the summation unit 112.

Control systems having control allocators of commercially available systems, although working well during most conditions, have a tendency to under certain circumstances introduce phase delays and "Pilot in the Loop Oscillations", as mentioned above. In order to prevent such phase delays and Pilot in the Loop Oscillations a system and a method according to the present invention is provided.

Figure 2:
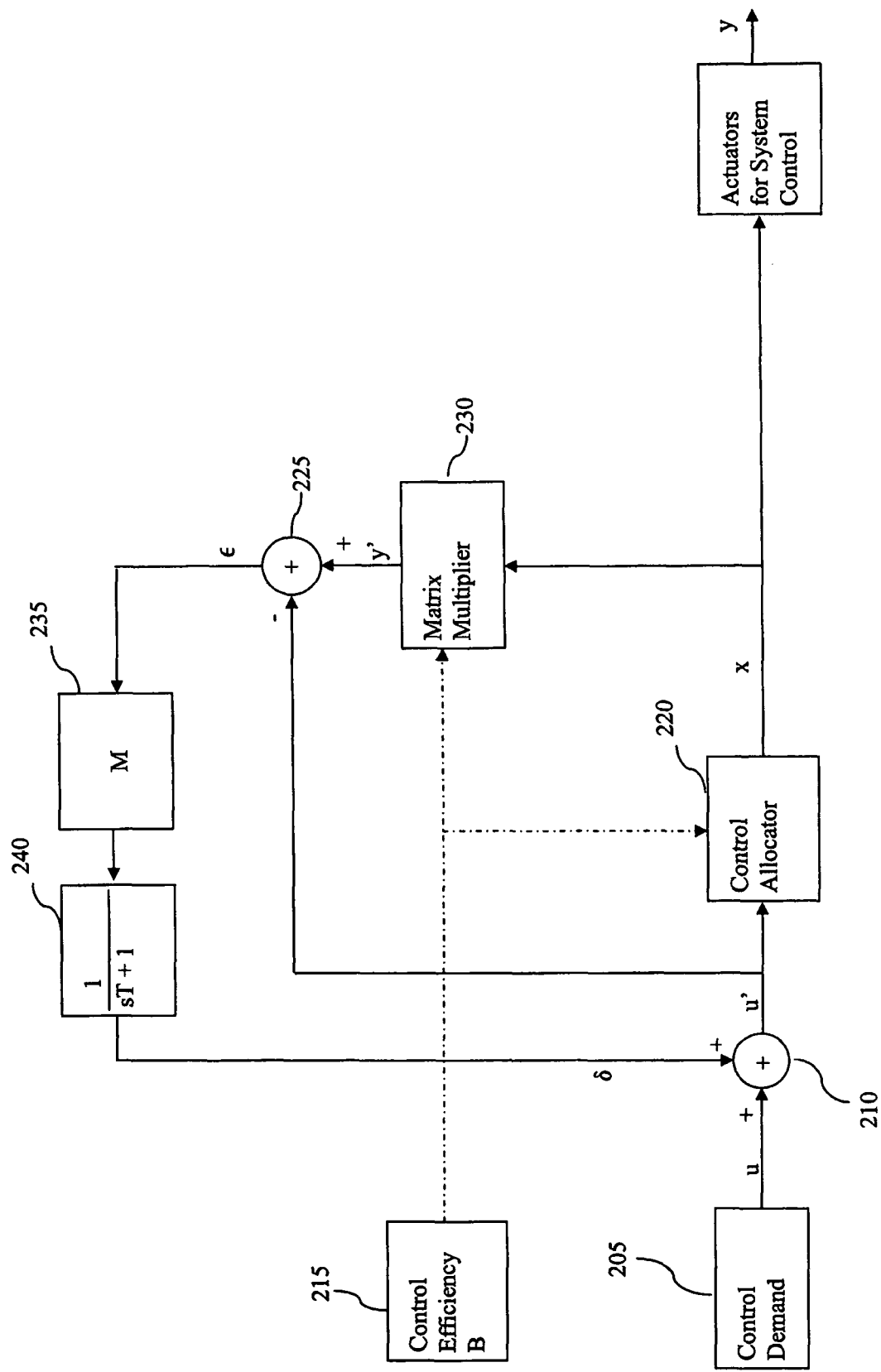
FIG. 2 is a block diagram showing a control system provided with control allocation means and feedback means for a general system according to the present invention.

FIG. 2 shows a block diagram of a general control system for controlling a vehicle according to the present invention. The control system combines control allocation technology and phase compensating technology. For the purpose of the present application the letter "k" is used to denote number of control requirements, i.e., the number of components in a control demand vector. The letter "m" is used to denote number of actuators.

A control demand device 205 provides a control demand vector u of dimension k. The control demand device 205 receives input from the pilot of the vehicle, i.e., it receives desired values of motion parameters via control sticks, steering wheels, pedals or the like as known in the art. It should be emphasized that the invention is not dependent on receiving motion parameters from a pilot, they may for example also be provided from a control unit of an autonomous vehicle or of a remotely operated vehicle or the like. The control demand may be expressed in different terms depending on application. In a fighter application e.g., the control demand may be expressed in terms of a plurality of angular accelerations.

The control demand vector u is fed to a positive input of a first summation unit 210. Said first summation unit 210 also receives input from a filter unit 240. We will return to this filter unit 240 later on.

The output of the first summation unit 210 is a modified control demand vector u' of dimension k, representing modified control demands. Said vector u' of modified control demands is fed via connections between the units to, on the one hand a control allocation unit 220 and, on the second hand, also to a second summation unit 225. The control allocation unit 220 allocates and distributes m actuator commands i.e., the output from the control allocation unit 220 is an actuator command signal vector, here called x, of dimension m. The function and characterising features of the control allocation unit will be further explained below.

Matrix Multiplier

The actuator command signal vector x is also fed to a matrix multiplication unit 230, which matrix multiplication unit 230, forms the matrix multiplication product B*x. The symbol "*" is here used to express a matrix multiplication operator. The matrix B is a control efficiency matrix of dimension k*m. The roles of the control efficiency matrix B will be further explained below.

The output B*x from the matrix multiplication unit 230, we can call an estimated vehicle behaviour, represented by an estimated behaviour signal vector y' of dimension k. The estimated behaviour signal vector is fed to the second summation unit 225, which forms a difference between the estimated behaviour y' and the modified control demand u'. For the purpose of this application we call this difference "the motion difference signal", and we denote it $\epsilon$. $\epsilon$ is a vector of dimension k.

The output from the second summation unit 225 is thus a motion difference signal called $\epsilon$. The motion difference signal $\epsilon$ can be said to represent an estimated difference between the (motion) control demand of the pilot of the vehicle on the vehicle and the expected motion parameters delivered by the vehicle when responsing to such a control demand. During normal flight this difference is non existent or very small. During advanced manoeuvres however, it may be significant.

Amplification and Filtering

The motion difference signal $\epsilon$ is fed to an amplification unit 235, where it is multiplied with amplification matrix M of dimension k*k.

The amplified signal, i.e., the output from the amplification unit 235 is subsequently fed to a filter unit 240, which unit applies a phase influencing filter, represented in FIG. 2 by a first order low-pass filter algorithm 1/(sT+1), on the amplified motion difference signal vector $\epsilon$. It should be understood that the filter unit provides filtering means to filter each component of an incoming signal vector independent of each other. For example, time constants (T) of the filter unit 240 for low-pass filtering may be different for different components of the amplified motion difference signal vector $\epsilon$. This may be accomplished by matrix multiplication of said amplified motion difference signal vector $\epsilon$ with a filter matrix having the following representation

[(s*T1+1)^-1, 0, ..., 0
0, (s*T2+1)^-1, 0, ..., 0
...
0, ... (s*Tk+1)^-1]

That is, a having filters as diagonal elements and zeroes outside the diagonal. In a preferred embodiment filter constants are chosen and adjusted such that certain preferred behaviour results when the vehicle is forced beyond the limits of the actuators. Asymptotically stable filters are preferably used, such as first order low-pass filters.

Thus a phase altered motion difference signal, represented by a vector δ is formed, constituting the output from the filter unit 240. The phase altered motion difference signal vector 6 is then fed to the first summation unit 210, and the feed-back loop is closed.

In an initial state, when the input signal to the filter unit 240, i.e., the amplified motion difference signal vector, is zero, i.e., when all components $\epsilon_1$ to $\epsilon_k$ are zero, that is, when the difference signal vector ε between estimated behaviour signal vector y' and modified control demand signal vector u' is zero, there should be no feedback. In a non-initial state the feedback signal is not zero but will converge towards zero if the amplified motion difference signal vector is zero, thereby diminishing the feedback. It is important, therefore, for the filters of the filter unit 240 to be truly stable, and for the output signal 6 (phase altered motion difference signal vector 6) from the filter unit 240 to decay towards zero when the input signal to the filter is zero, like e.g. an infinite impulse filter.

Control Efficiency Matrix

As is known in the art, the control efficiency matrix expresses how efficient each actuator is to bring about a certain control demand, which in turn is dependent on the design of the specific vehicle and actuators in question. The control efficiency matrix B is a dynamic piece of information that is continuously being recalculated. In the case of an aircraft, these recalculations are based on current speed, angle of attack and angle of sideslip sensor signals, air density/pressure, fault signals, and other sensor signals being relevant for actuator efficiency.

Control Allocation Unit

The control allocation unit 220 uses the modified control demand signal vector u' of dimension k and the control efficiency matrix B to produce an actuator command signal vector x. This is done by a control allocation method selected from a group of methods used to solve the so called control allocation problem, which in short can be defined as the problem of finding the actuator command signal vector that, given the control efficiency matrix and the actuator limitations, would bring about a motion pattern of the vehicle as represented by a control demand signal vector. One of the features of the present invention is to modify the control demand signal vector when an original control demand signal vector represents a demanded motion pattern that simply cannot or will not be realised by the vehicle due to e.g. performance limits, may they be real or set by certain rules or provisions. The present invention is not dependent on a particular control allocation method to be used, it could for example be an optimization based control allocation method, a direct control allocation method or a daisy chain control allocation method as described for example in "Backstepping and Control Allocation with Applications to Flight Control" by Ola Härkegård pages 114-122.

Function

When the change in any of the control demand signal vector components $u_1$ to $u_k$ exceeds what is possible for the vehicle to achieve under current conditions, in spite of efficient control allocation, the signal ε will be different from zero. Indeed, if the modified control demand signal vector u' is increasing to a level where actuators cannot bring the vehicle in compliance with said demand, the control allocator unit 220 makes the best from the situation according to the control allocation method used as mentioned above, for producing an actuator command signal vector x. The actuator command signal vector x can be fed in parallel to the actuators and to a matrix multiplier unit 230 as described above. The matrix multiplier unit 230 calculates an estimated behaviour signal vector y', which is directly comparable with the modified control demand vector u'. In an initial stage, the modified control demand vector u' is not yet compensated and therefore identical to u and the difference signal ε become negative. After amplification and filtering the difference signal is used to decrease the input signal u' to the control allocator 220 to a value smaller than the control demand vector u.

Alternative Feeding of Summation Units

It is realised that the same functionality is achieved by forming an alternative motion difference signal vector ε' as u'-y' (instead of y'-u') and subtracting ε', or corresponding filtered motion difference signal vector δ', i.e feeding δ' to a negative input of the first summation unit 210.

Method

Figure 3:
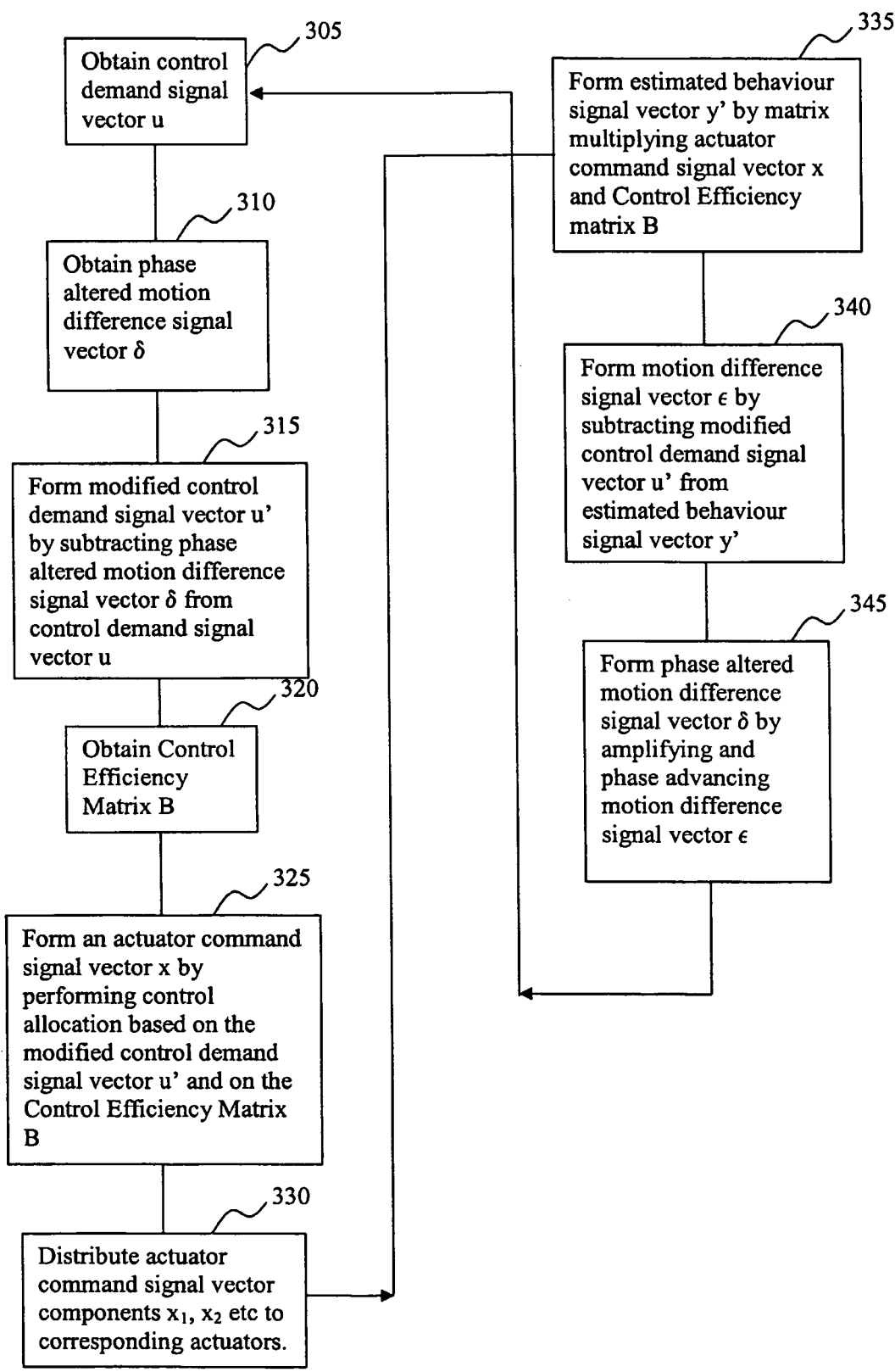
FIG. 3 shows a flowchart representing a method according to an embodiment of the invention.

FIG. 3 is a flowchart of a method for vehicle control according to a preferred embodiment of the present invention. The method comprises the following steps:

obtaining (305) a control demand signal vector u;

obtaining (310) a phase altered motion difference signal vector δ;

forming (315) a modified demand signal vector u' by subtracting the phase altered motion difference signal vector δ from the control demand signal vector u;

obtaining (320) a control efficiency matrix B;

forming (325) an actuator command signal vector x by performing control allocation based on the modified demand signal vector u' and on the control efficiency matrix B;

distributing (330) actuator command signal vector x components $x_1$, $x_2$ etc to corresponding actuators;

forming (335) an estimated behaviour signal vector y' by matrix multiplying the actuator command signal vector x with the control efficiency matrix B;

forming (340) a motion difference signal vector ε by subtracting the modified control demand signal vector u' from the estimated behaviour signal vector y';

forming (345) the phase altered motion difference signal vector δ by amplifying and filtering the motion difference signal vector ε

The steps of the method are then repeated multiple times each second as is known in the art. The method may be implemented in software or hardware or in a combination of hardware and software as is realised by a person skilled in the art.

One advantage with the above solution is that it is possible to employ the advantages with control allocation techniques and at the same time provide phase compensation when the control demands not can be met by use of the control allocation technology. Another advantage is that a pilot perceived reduction of the speed of actuator response due to performance limitations is transformed to a reduction in amplification, which will reduce or totally eliminate pilot in the loop oscillations.

Figure 4:
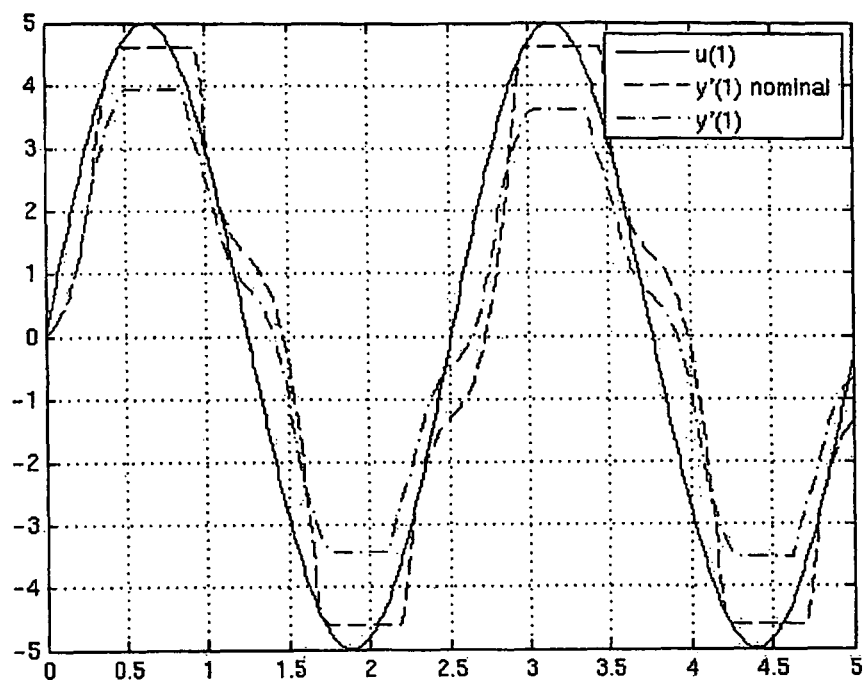
FIGS. 4 and 5 shows diagrams of simulation runs for demonstrating the performance of a control system according to an embodiment of the invention compared to a prior art system.
Figure 5:
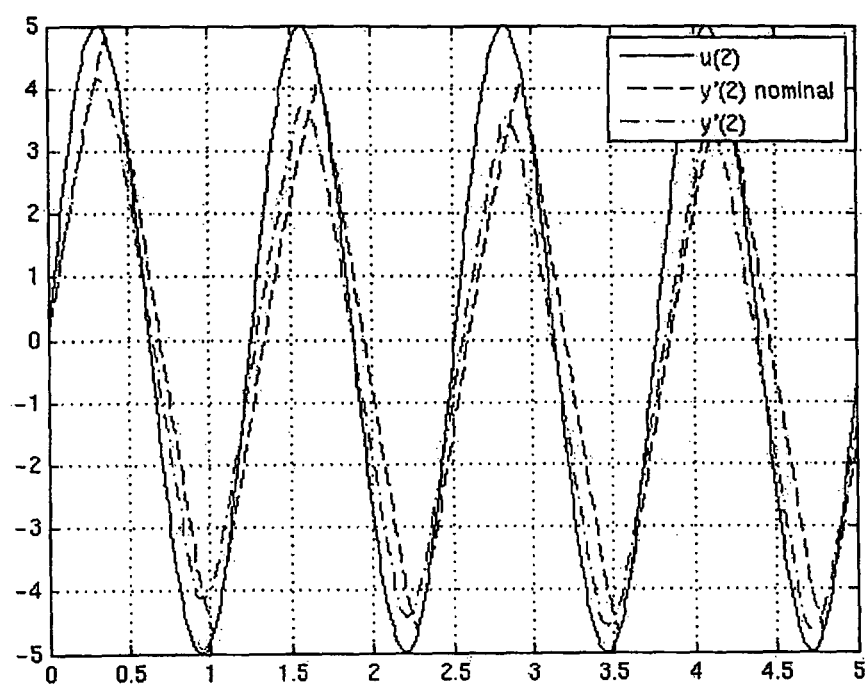

FIGS. 4 and 5 shows diagrams of a two-dimensional simulation run for demonstrating the performance of a vehicle control systems according to the present invention compared to a prior art system fed with the same control demand signal vector. The following notation is used:

u(1) is first component of control demand signal vector u u(2) is second component of control demand signal vector u y'(1) nominal is the first component of an estimated behaviour signal vector y' for a prior art system y'(2) nominal is the second component of an estimated behaviour signal vector y' for a prior art system;

y'(1) is the first component of an estimated behaviour signal vector y' for a system according to an embodiment of the present invention y'(2) is the second component of an estimated behaviour signal vector y' for a a system according to an embodiment of the present invention;

FIG. 4 shows a diagram for the first component. The control allocation method uses hard optimisation towards the input signal, i.e., the control demand signal vector component u(1). This is why the estimated behaviour signal component y'(1) looks a bit distorted. Nevertheless, the estimated behaviour signal (y'(1)) for a system according to the invention follows better, i.e., with less phase delay, than the prior art system (y'(1) nominal). It can be seen that the phase loss can be said to be converted to a (small) amplification loss instead.

FIG. 5 shows a diagram for the second component. The control allocation method uses higher penalty for deviations from u(2) than u(1). It can be seen that the phase loss (time delay) is considerably lower for the estimated behaviour signal second component for the system according to the invention (y'(2)) than for the prior art system (y'(2) nominal).

The invention claimed is:

1. A vehicle control system for a vehicle, comprising:
control elements configured to alter at least one of a speed, altitude or course of a vehicle;
an input actuator configured to be actuated by an operator to input control demand;
a control allocator configured to allocate a received control demand by providing actuator control signals derived from said control demand to a plurality of actuators for the control elements;
a feedback module comprising a behaviour estimation unit configured to form and to feedback via a feedback loop a feedback signal representative of a difference between a desired vehicle behaviour represented by a control demand signal vector and an estimated vehicle behaviour that would result from said actuator signals at current travel conditions, wherein the control demand signal vector is an output from control laws of the control system, such that the behaviour estimation unit estimates behaviour of the vehicle control system based on a commanded actuator input, the feedback signal being arranged to modify said control demand signal vector forming a modified control demand signal vector such that the modified control demand signal vector, in the case the control demand signal vector represents a control demand greater than performance limits of the vehicle under current conditions, will come to represent a control demand within said performance limits when the feedback signal takes effect; and
a control efficiency unit configured to keep and update information regarding the efficiency of the actuators of the vehicle, wherein the behaviour estimation unit is configured to use information from said control efficiency unit to calculate the estimated vehicle behaviour.

2. The vehicle control system according to claim 1, further comprising:
an input configured to receive the control demand signal vector and
an output configured to output the actuator control signals, wherein said feedback loop configured to calculate and feedback the feedback signal representative of a difference between the control demand signal vector and an estimated vehicle behaviour also comprises a transfer function module, and wherein said transfer function module comprises asymptotically stable filters.

3. The vehicle control system according to claim 2, wherein said control allocator comprises an actuator command signal vector, and wherein said feedback module comprises a matrix multiplication unit configured to form an estimated behaviour signal vector, an output of said matrix multiplication unit is connected to an input of a first summation unit configured to form a motion difference signal vector, an output of said summation unit being connected to an amplification unit, an output from the amplification unit is connected to an input of a filter unit configured to form a phase altered motion difference signal vector, an output of said filter unit is connected to an input of a second summation unit configured to form a modified control demand signal vector as a difference between a control demand signal vector and said phase altered motion difference signal vector, the output of said second summation unit being connected to the input of the first summation unit and to an input of the control allocator.

4. The vehicle control system according to claim 3, further comprising:
a control efficiency matrix unit and a matrix multiplication unit configured to use a control efficiency matrix of the control efficiency matrix unit to form an estimated behaviour signal vector by matrix multiplication of the actuator command signal vector and the control efficiency matrix.

5. The vehicle control system according to claim 3, wherein said filter unit comprises a number of asymptotically stable low pass filters configured to filter each component of an input signal vector to a filter unit.

6. The vehicle control system according to claim 1, wherein control allocator is configured to perform the allocation utilizing a control allocation method selected from a group of control allocation methods comprising an optimization based control allocation method, a direct control allocation method and a daisy chain control allocation method.

7. The vehicle control system according to claim 1, wherein said filter unit comprises a number of asymptotically stable low pass filters configured to filter each component of an input signal vector to a filter unit.

8. A vehicle control system for a vehicle, comprising:
control elements configured to alter at least one of a speed, altitude or course of a vehicle;
an input actuator configured to be actuated by an operator to input control demand;
a control allocator configured to allocate a received control demand by providing actuator control signals derived from said control demand to a plurality of actuators for the control elements, wherein said control allocator comprises an actuator command signal vector, wherein the control demand signal vector is an output from control laws of the control system;
a feedback module comprising a behaviour estimation unit configured to form and to feedback via a feedback loop a feedback signal representative of a difference between a desired vehicle behaviour represented by a control demand signal vector and an estimated vehicle behaviour that would result from said actuator signals at current travel conditions, such that the behaviour estimation unit estimates behaviour of the vehicle control system based on a commanded actuator input, the feedback signal being arranged to modify said control demand signal vector forming a modified control demand signal vector such that the modified control demand signal vector, in the case the control demand signal vector represents a control demand greater than performance limits of the vehicle under current conditions, will come to represent a control demand within said performance limits when the feedback signal takes effect;

an input configured to receive the control demand signal vector; and an output configured to output the actuator control signals, wherein said feedback loop configured to calculate and feedback the feedback signal representative of a difference between the control demand signal vector and an estimated vehicle behaviour also comprises a transfer function module, and wherein said transfer function module comprises asymptotically stable filters, said feedback module comprises a matrix multiplication unit configured to form an estimated behaviour signal vector, an output of said matrix multiplication unit is connected to an input of a first summation unit configured to form a motion difference signal vector, an output of said summation unit being connected to an amplification unit, an output from the amplification unit is connected to an input of a filter unit configured to form a phase altered motion difference signal vector, an output of said filter unit is connected to an input of a second summation unit configured to form a modified control demand signal vector as a difference between a control demand signal vector and said phase altered motion difference signal vector, and the output of said second summation unit being connected to the input of the first summation unit and to an input of the control allocator.

9. The vehicle control system according to claim 8, further comprising:

a control efficiency matrix unit and a matrix multiplication unit configured to use a control efficiency matrix of the control efficiency matrix unit to form an estimated behaviour signal vector by matrix multiplication of the actuator command signal vector and the control efficiency matrix.

10. The vehicle control system according to claim 8, further comprising:

a control efficiency unit configured to keep and update information regarding the efficiency of the actuators of the vehicle, wherein the behaviour estimation unit is configured to use information from said control efficiency unit to calculate the estimated vehicle behaviour.

11. The vehicle control system according to claim 8, wherein control allocator is configured to perform the allocation utilizing a control allocation method selected from a group of control allocation methods comprising an optimization based control allocation method, a direct control allocation method and a daisy chain control allocation method.

* * * * *